United States Patent
Björklund et al.

(10) Patent No.: US 10,710,035 B1
(45) Date of Patent: Jul. 14, 2020

(54) FEED MIXTURE DISTRIBUTION DEVICE

(71) Applicant: OUTOTEC (FINLAND) OY, Espoo (FI)

(72) Inventors: Peter Björklund, Espoo (FI); Kaj Eklund, Espoo (FI); Aki Laaninen, Espoo (FI); Jaana Romppanen, Helsinki (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/798,879

(22) Filed: Feb. 24, 2020

Related U.S. Application Data

(63) Continuation of application No. PCT/FI2017/050613, filed on Sep. 1, 2017.

(51) Int. Cl.
 *B01F 5/00* (2006.01)
 *B01F 5/06* (2006.01)
 (Continued)

(52) U.S. Cl.
 CPC .......... *B01F 5/0612* (2013.01); *B01F 5/0614* (2013.01); *B01F 5/0618* (2013.01);
 (Continued)

(58) Field of Classification Search
 CPC .... B01F 5/0612; B01F 5/0614; B01F 5/0618; B01F 5/0657; B01F 2005/0625; B01F 2215/0085; F27B 3/18; F27D 3/0033
 See application file for complete search history.

(56) References Cited

U.S. PATENT DOCUMENTS

| 3,635,444 A * | 1/1972 | Potter | B01F 5/0615 366/339 |
| 7,484,881 B2 * | 2/2009 | Schulz-Hanke | B01F 1/0027 366/339 |
| 2009/0122638 A1 * | 5/2009 | Sato | B01F 3/0861 366/339 |

FOREIGN PATENT DOCUMENTS

| CN | 200955737 Y | 10/2007 |
| WO | 2015054739 A1 | 4/2015 |

(Continued)

OTHER PUBLICATIONS

International Search Report issued by the Finnish Patent and Registration Office as the International Searching Authority in relation to International Application No. PCT/EP2017/050613 dated Dec. 19, 2017 (5 pages).

(Continued)

*Primary Examiner* — Anshu Bhatia
(74) *Attorney, Agent, or Firm* — Robert P. Michal, Esq.; Carter, DeLuca & Farrell LLP

(57) ABSTRACT

A feed mixture distribution device configured to even out a feed of feed mixture in an annular feed mixture feed channel of a burner. The feed mixture distribution device includes a cylindrical member having a cylindrical wall, a first end, a second end, and a longitudinal central axis X. The cylindrical member is at the first end provided with rectangular flat plate means, which extend radially from the cylindrical wall of the cylindrical member and which are arranged symmetrically about the longitudinal central axis X of the cylindrical member. The cylindrical wall of the cylindrical member is between the rectangular flat plate and the second end provided with helical plate means arranged symmetrically about the longitudinal central axis X of the cylindrical member.

14 Claims, 18 Drawing Sheets

(51) Int. Cl.
*F27B 3/18* (2006.01)
*F27D 3/00* (2006.01)

(52) U.S. Cl.
CPC .............. *B01F 5/0657* (2013.01); *F27B 3/18* (2013.01); *F27D 3/0033* (2013.01); *B01F 2005/0625* (2013.01); *B01F 2215/0085* (2013.01)

(56) References Cited

FOREIGN PATENT DOCUMENTS

WO 2015077875 A1 6/2015
WO 2017072413 A1 5/2017

OTHER PUBLICATIONS

Written Opinion of the International Searching Authority issued by the Finnish Patent and Registration Office acting as the International Searching Authority in relation to International Application No. PCT/EP2017/050613 dated Dec. 19, 2017 (6 pages).
International Preliminary Report on Patentability issued by the European Patent Office acting as the International Preliminary Examining Authority in relation to International Application No. PCT/EP2017/050613 dated Aug. 7, 2019 (7 pages).

Figure 1:
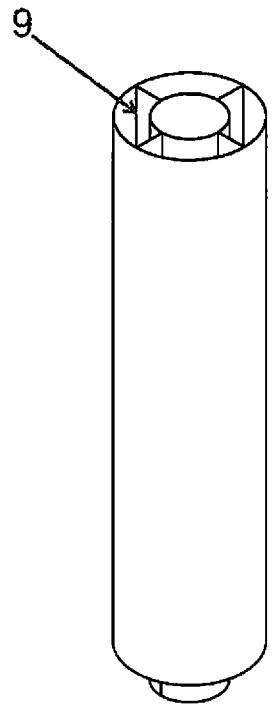
Figure 2:
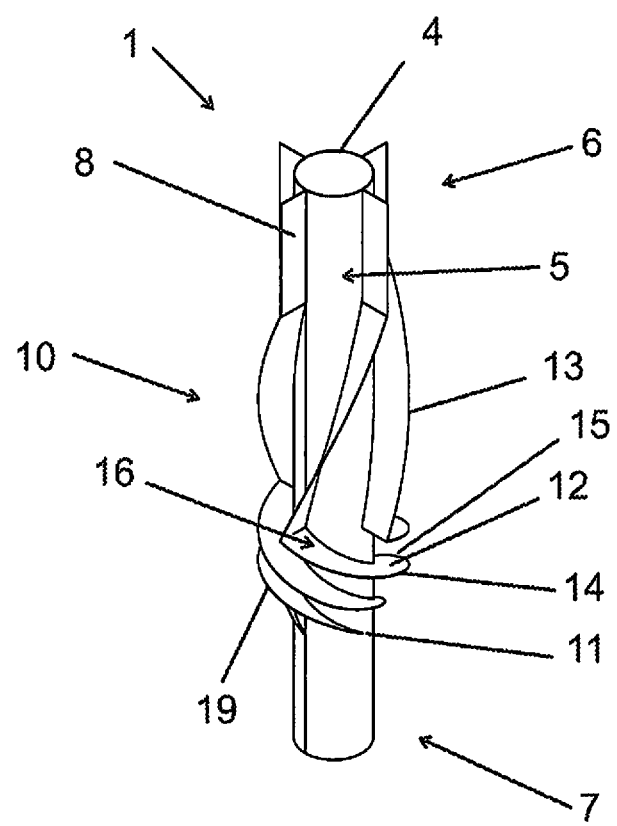
Figure 3:
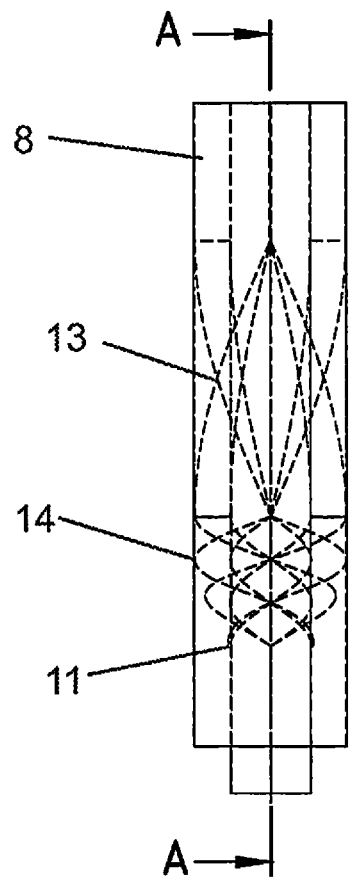
Figure 4:
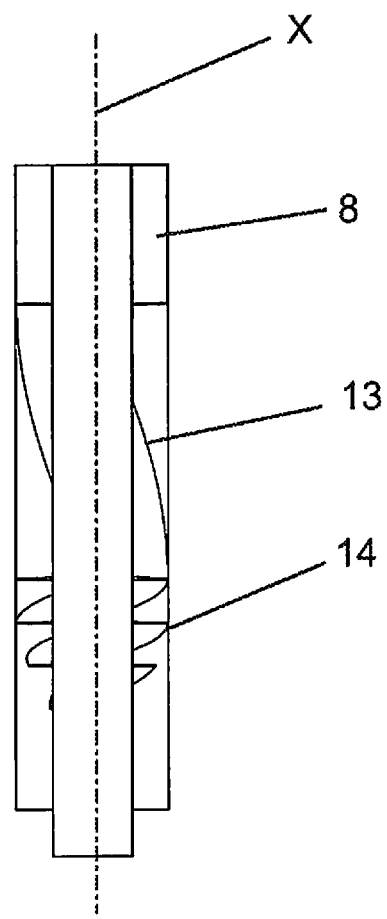
Figure 5:
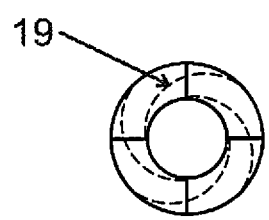
Figure 6:
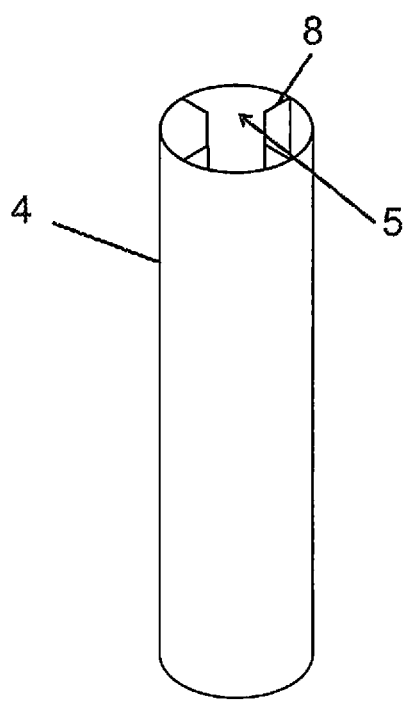
Figure 7:
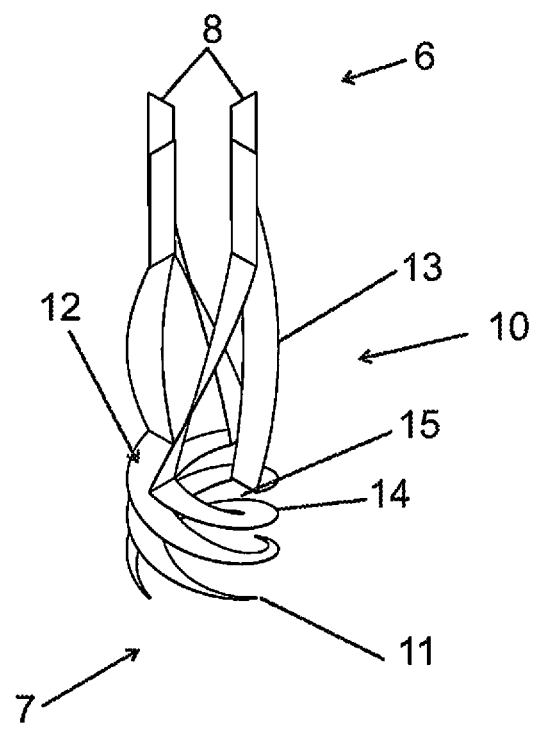
Figure 8:
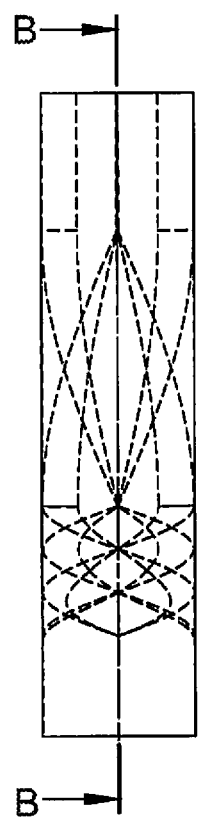
Figure 9:
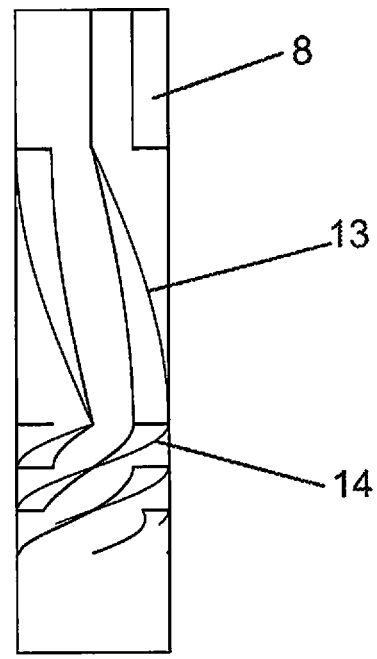
Figure 10:
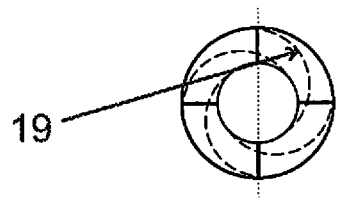
Figure 11:
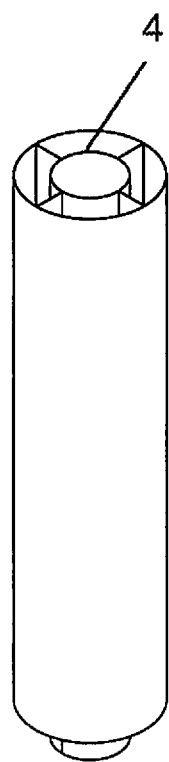
Figure 12:
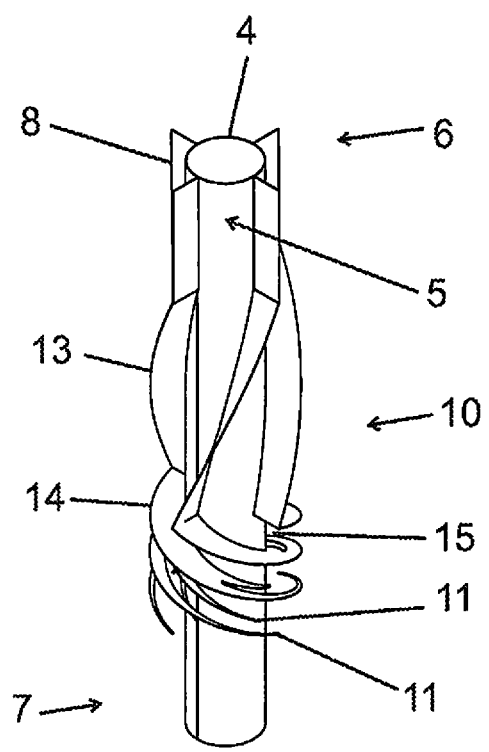
Figure 13:
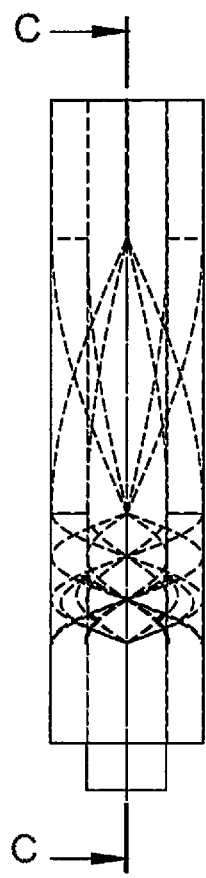
Figure 14:
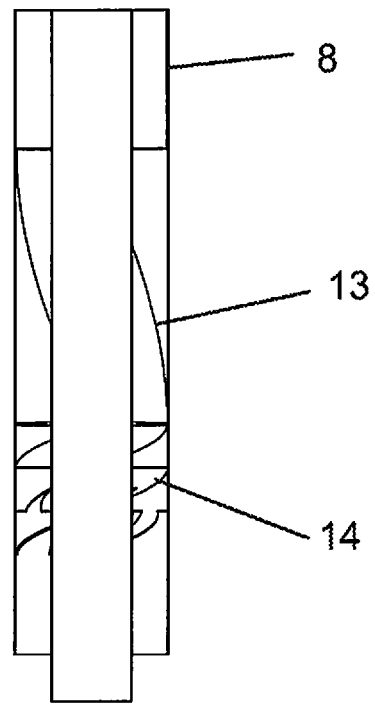
Figure 15:
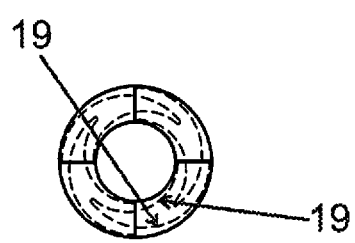
Figure 18:
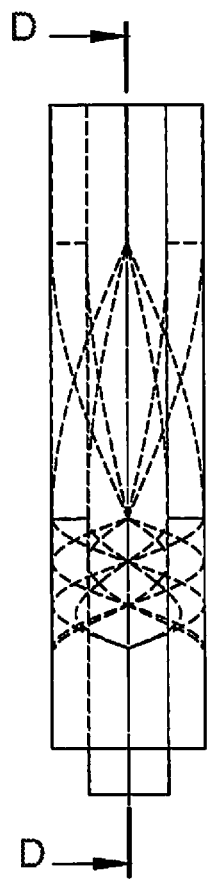
Figure 19:
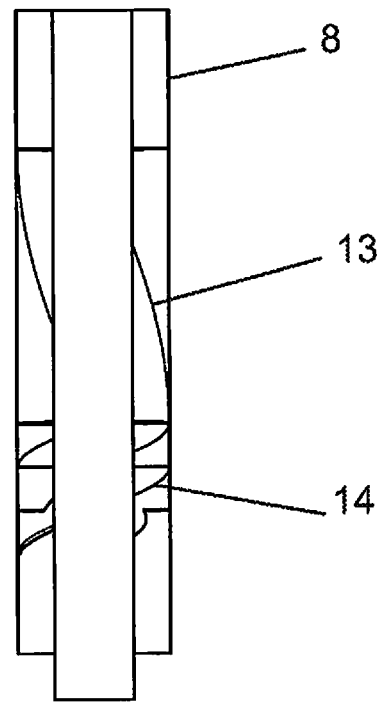
Figure 20:
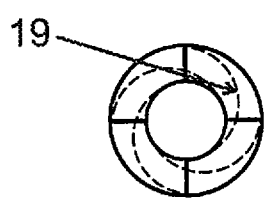
Figure 25:
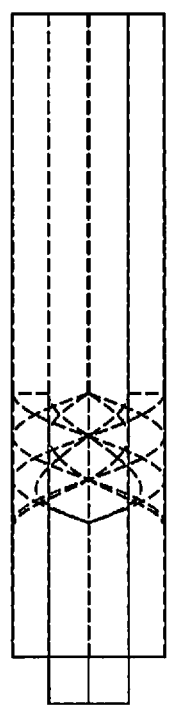
Figure 26:
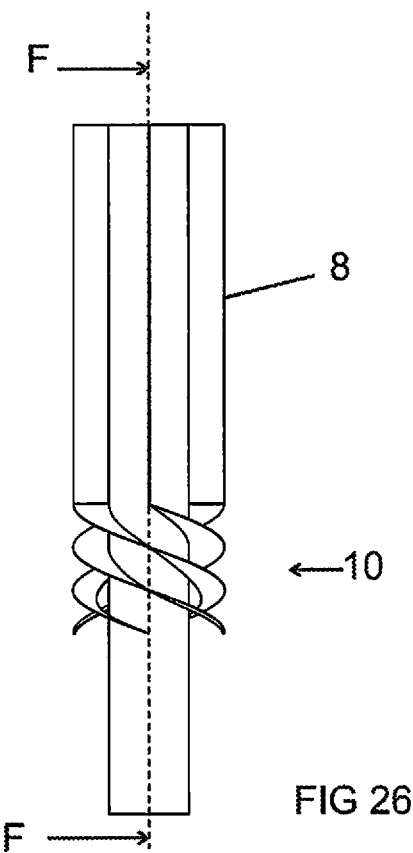
Figure 27:
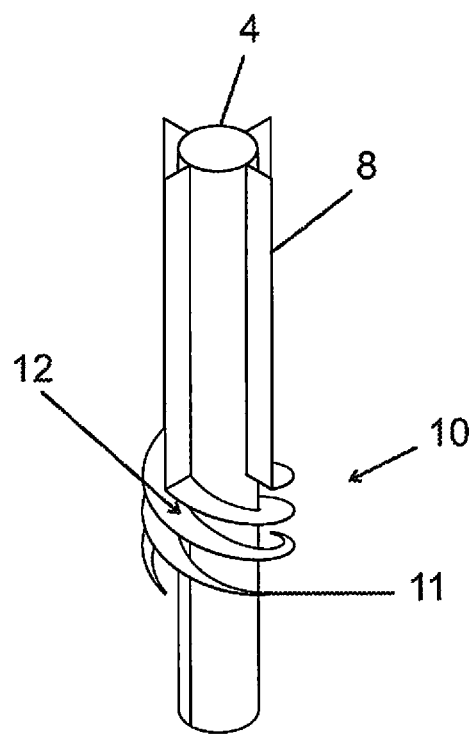
Figure 28:
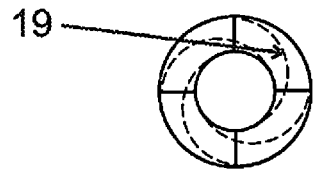
Figure 29:
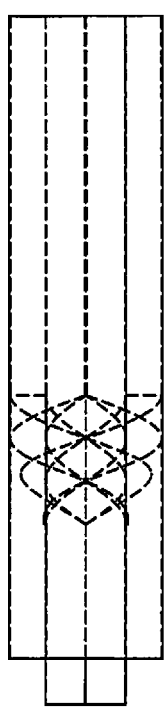
Figure 30:
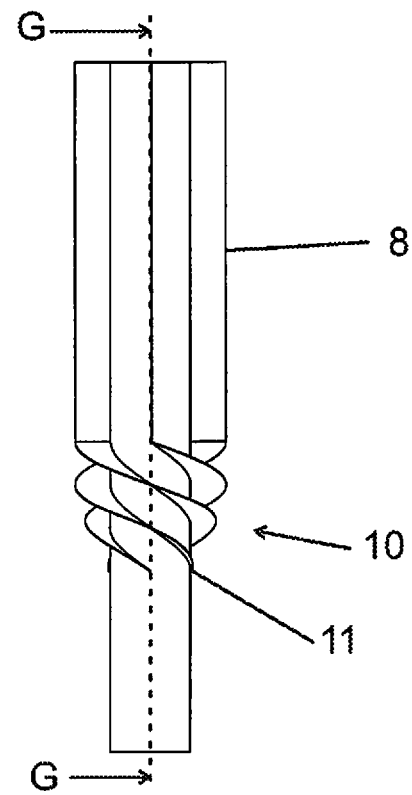
Figure 31:
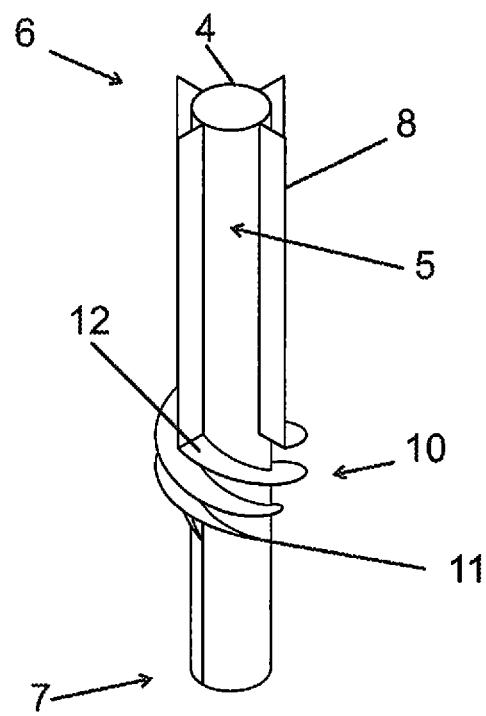
Figure 32:
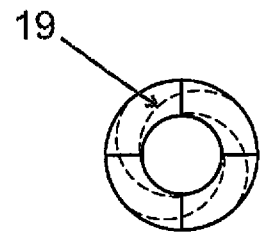
Figure 33:
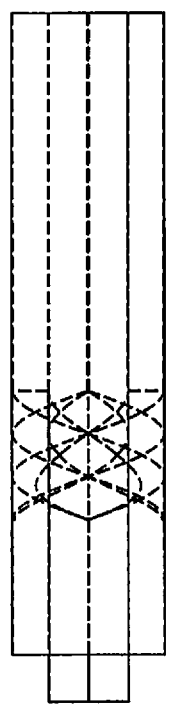
Figure 34:
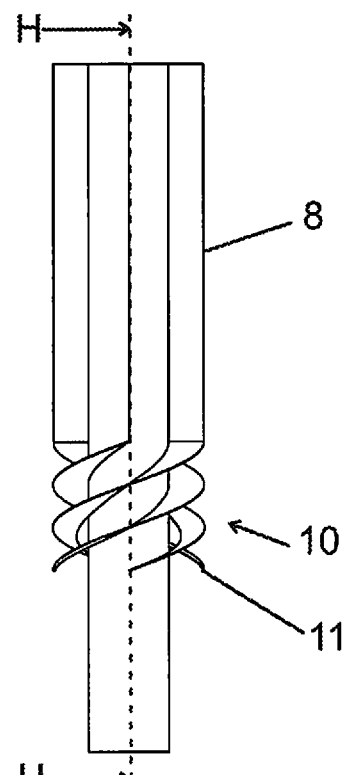
Figure 35:
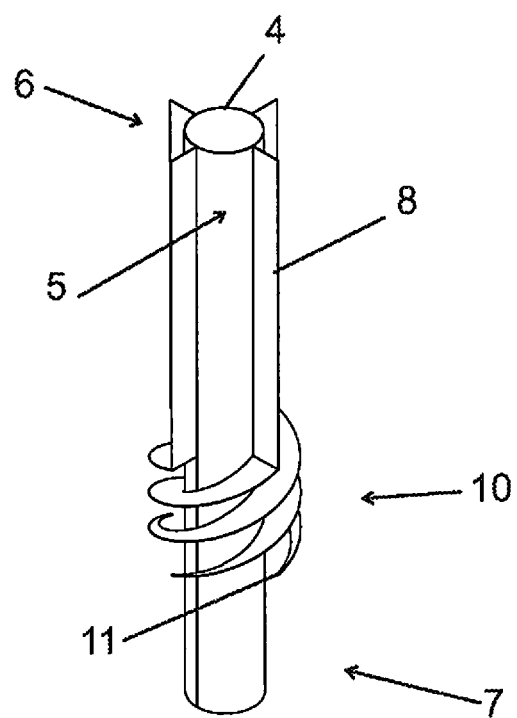
Figure 36:
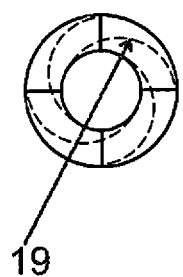
Figure 37:
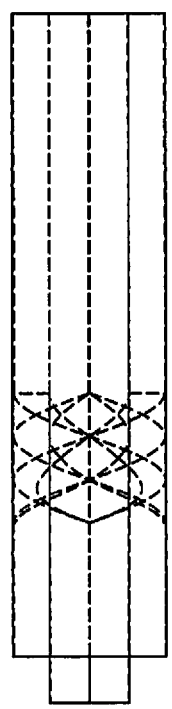
Figure 38:
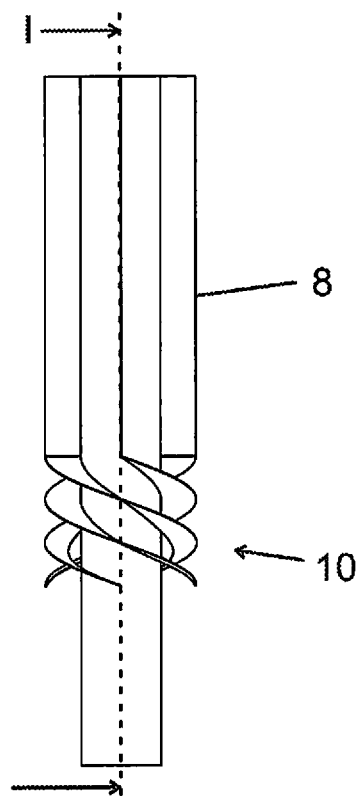
Figure 39:
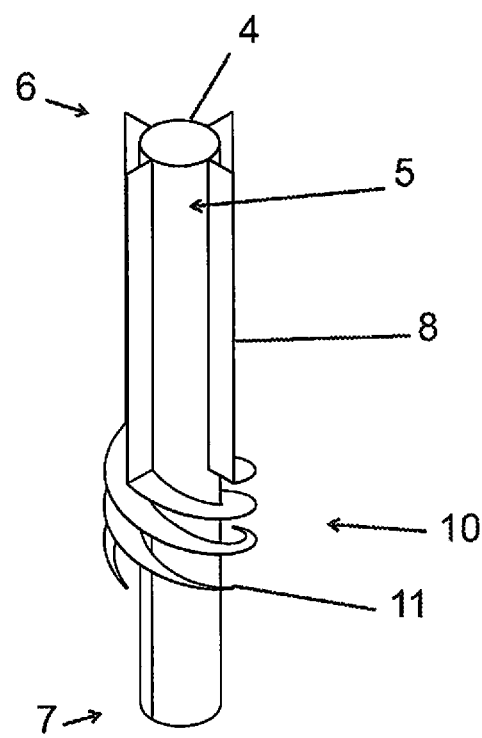
Figure 40:
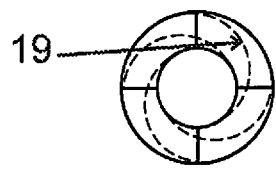

* cited by examiner (FIG 3 SECTION A-A)

(FIG 8 SECTION B-B)

(FIG 13 SECTION C-C)

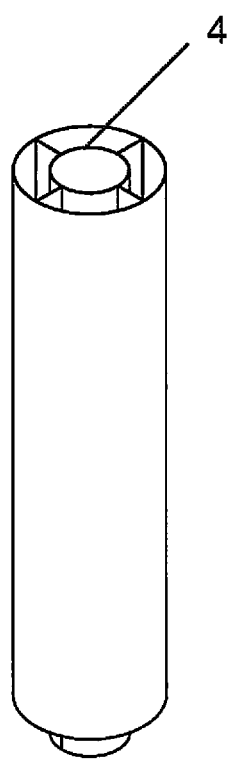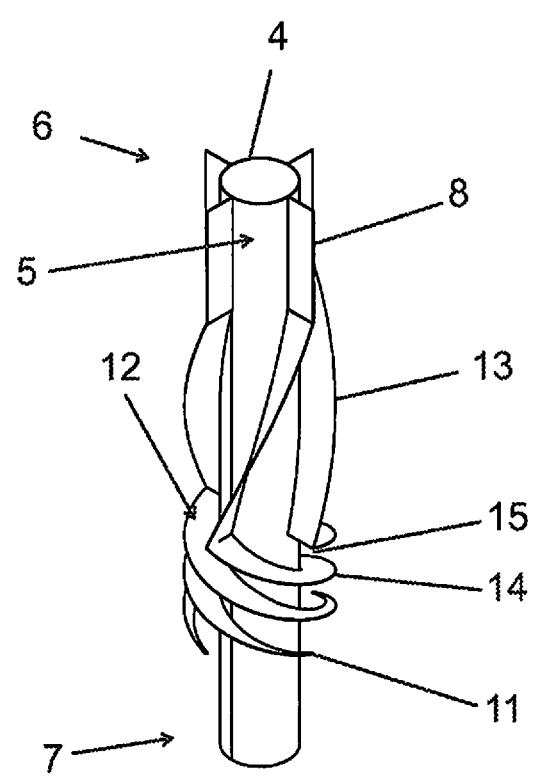
FIG 16
FIG 17

(FIG 18 SECTION D-D)

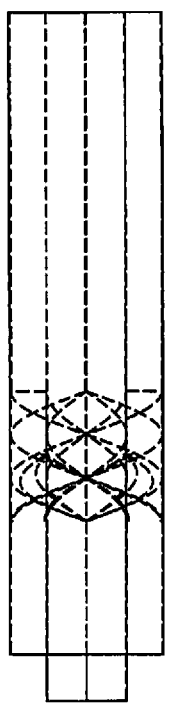
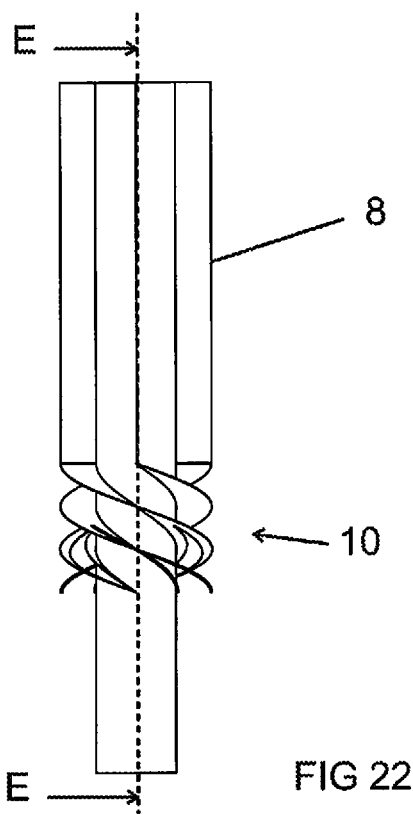
(FIG 22 SECTION E-E)
FIG 21
FIG 22
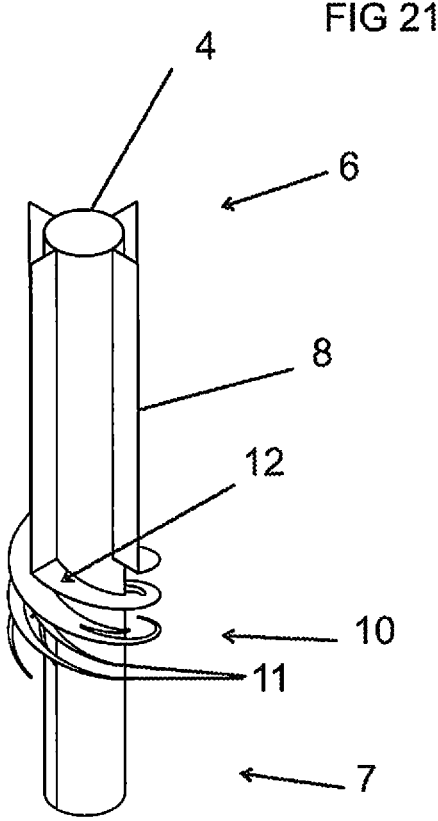
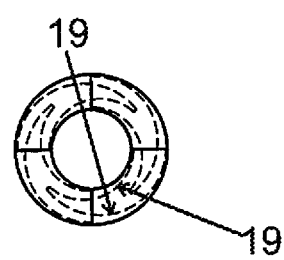
FIG 23
FIG 24

(FIG 26 SECTION F-F)

(FIG 30 SECTION G-G)

(FIG 34 SECTION H-H)

(FIG 38 SECTION I-I)

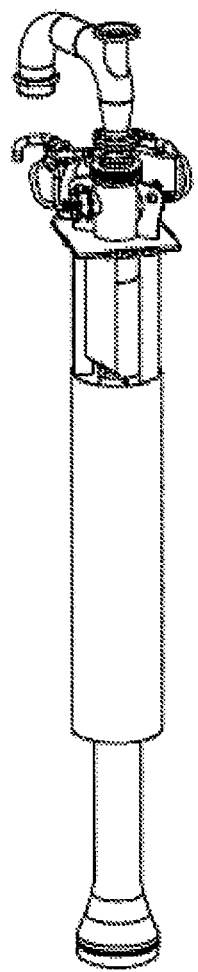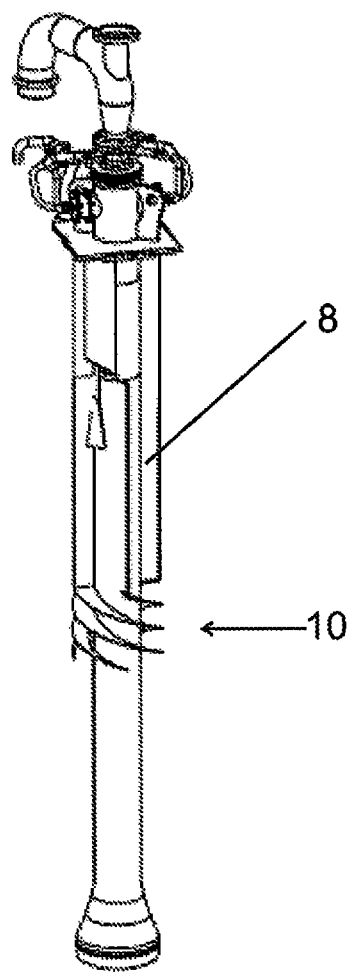
FIG 43
FIG 44

FEED MIXTURE DISTRIBUTION DEVICE

CROSS-REFERENCE TO RELATED APPLICATIONS

This application is a continuation of PCT International Application No. PCT/FI2017/050613 filed Sep. 1, 2017, the disclosure of this application is expressly incorporated herein by reference in its entirety.

FIELD OF THE INVENTION

The invention relates to a feed mixture distribution device.

A uniform feed distribution of feed mixture that is fed into a reaction shaft of a suspension smelting furnace has numerous benefits especially in direct-to-blister processes.

It is known in the art to control the feed distribution in an annular feed mixture feed channel of a suspension smelting burner by dividing the annular feed mixture feed channel into sectors with rectangular flat plate means. The annular feed mixture feed channel is radially inwards limited by an inner cylindrical and radially outwards limited by an outer cylindrical wall. The rectangular flat plate means extend between the inner cylindrical wall and the outer cylindrical wall to divide the annular feed mixture feed channel into sectors.

Publication WO 2015/054739 presents a dispersion apparatus for use with a solid fuel burner. In this dispersion apparatus, the annular feed mixture feed channel is divided into sectors by means of rectangular flat plate means extend between the inner cylindrical wall and the outer cylindrical of the annular feed mixture feed channel. This known dispersion apparatus comprises additionally spirals each of which form an extension one of the rectangular flat plate means and which gives the flow of solid fuel coming from the sectors a rotational motion about a longitudinal axis of the annular feed mixture feed channel. This known dispersion apparatus comprises additionally downstream guide means, which are arranged downstream of the spirals and which are configured to at least partly reduce the rotational motion of the flow of solid fuel.

Objective of the Invention

The object of the invention is to provide a feed mixture distribution device, which provides for a uniform feeding of feed mixture into a reaction shaft of a suspension smelting furnace.

LIST OF FIGURES

Figure 41:
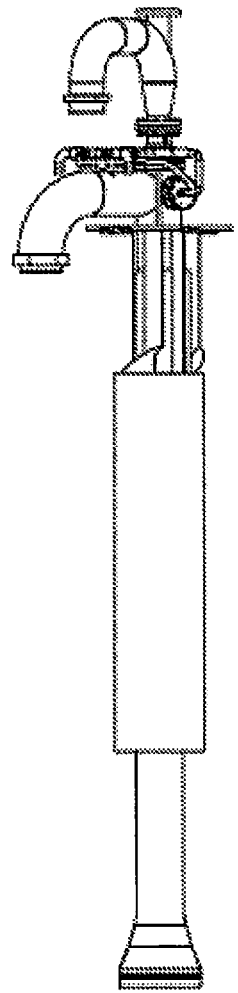
Figure 42:
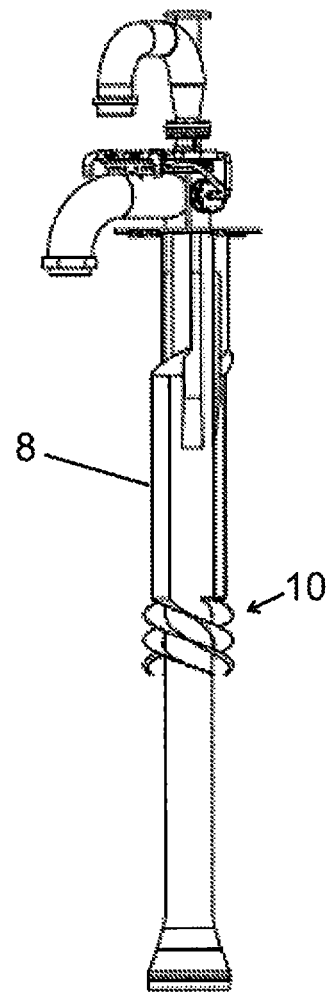
Figure 45:
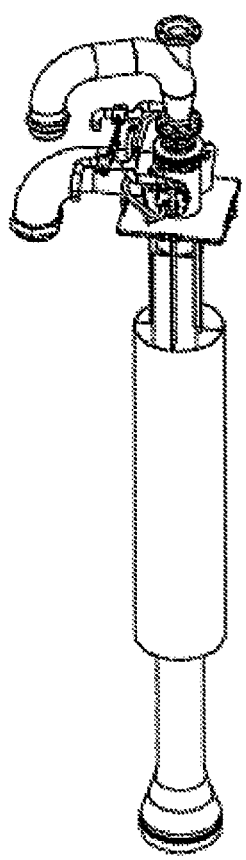
Figure 46:
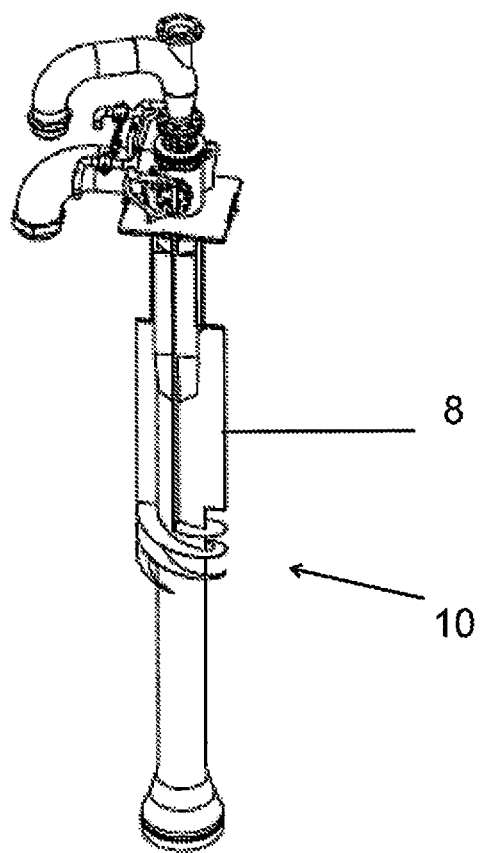
Figure 47:
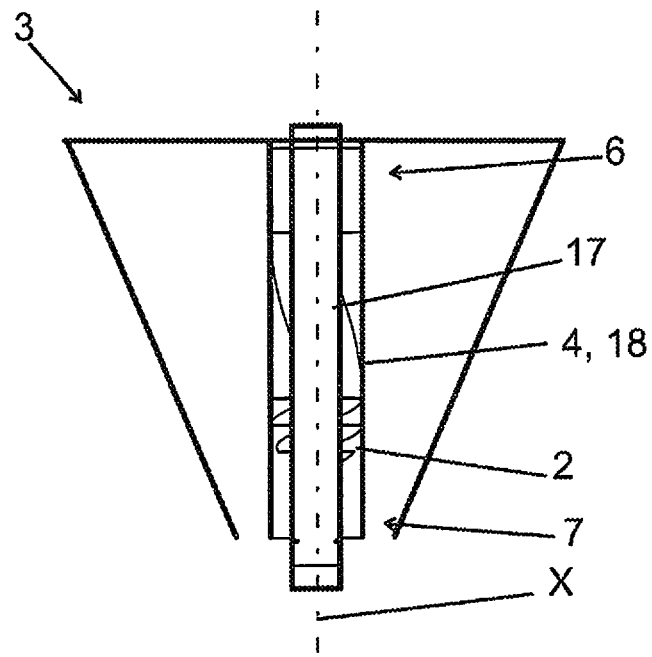
Figure 48:
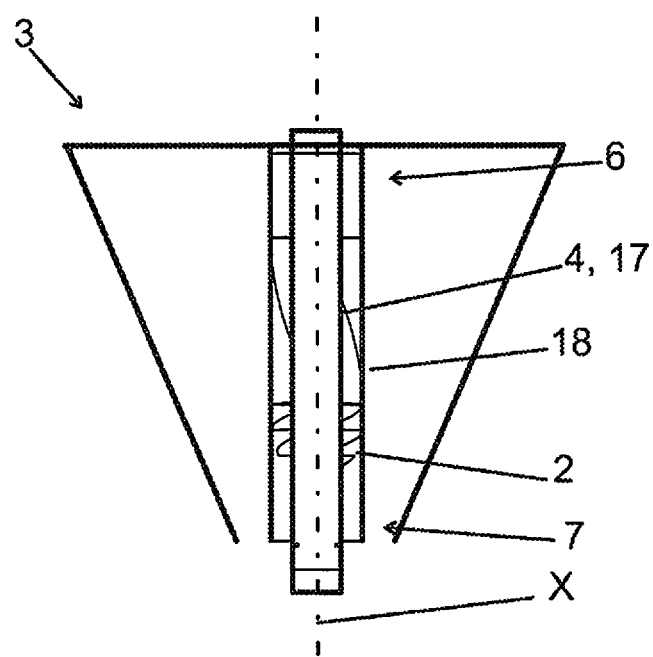
Figure 49:
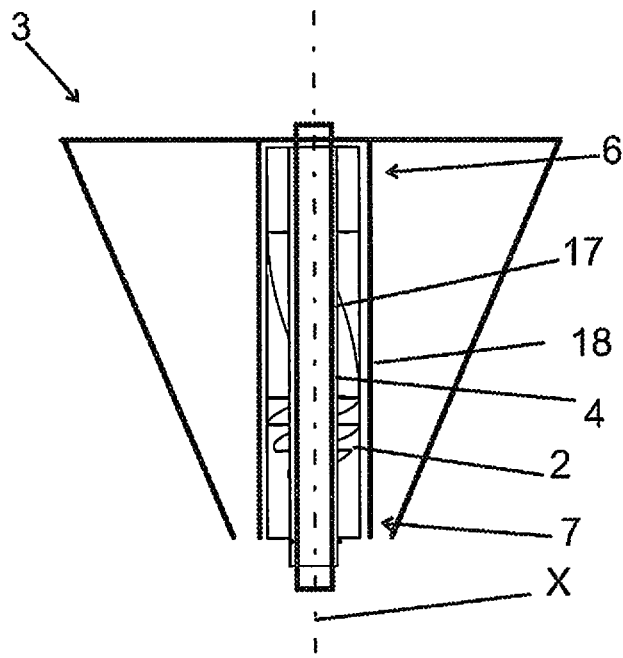
Figure 50:
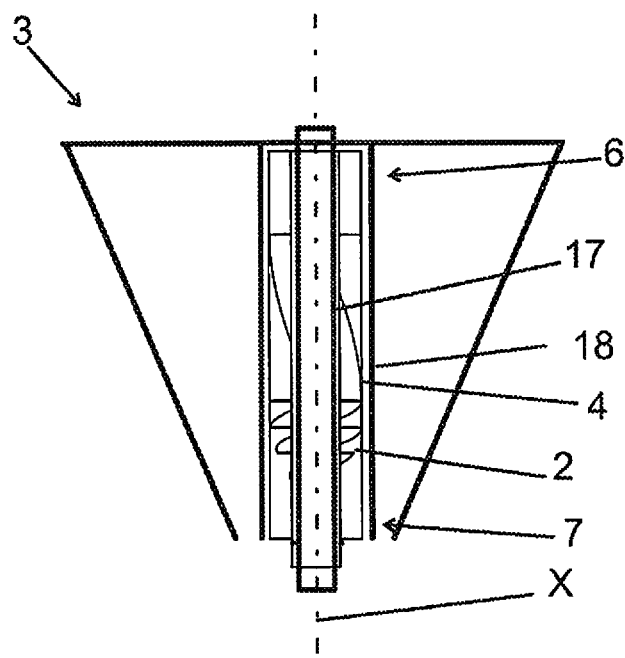

In the following the invention will described in more detail by referring to the figures, of which FIGS. 1, 2, 3, 4 and 5 show a first embodiment of the feed mixture distribution device, FIGS. 2, 3, 4, 5, 6, 7, 8, 9 and 10 show a second embodiment of the feed mixture distribution device, FIGS. 11, 12, 13, 14 and 15 show a third embodiment of the feed mixture distribution device, FIGS. 16, 17, 18, 19 and 20 show a fourth embodiment of the feed mixture distribution device, FIGS. 21, 22, 23 and 24 show a fifth embodiment of the feed mixture distribution device, FIGS. 25, 26, 27 and 28 show a sixth embodiment of the feed mixture distribution device, FIGS. 29, 30, 31 and 32 show a seventh embodiment of the feed mixture distribution device, FIGS. 33, 34, 35 and 36 show an eight embodiment of the feed mixture distribution device, FIGS. 37, 38, 39 and 40 show a ninth embodiment of the feed mixture distribution device, FIGS. 41 and 42 show a tenth embodiment of the feed mixture distribution device, FIGS. 43 and 44 show an eleventh embodiment of the feed mixture distribution device, FIGS. 45 and 46 show a twelfth embodiment of the feed mixture distribution device, FIG. 47 shows a thirteenth embodiment of the feed mixture distribution device, FIG. 48 shows a fourteenth embodiment of the feed mixture distribution device, FIG. 49 shows a fifteenth embodiment of the feed mixture distribution device, and FIG. 50 shows a sixteenth embodiment of the feed mixture distribution device.

DETAILED DESCRIPTION OF THE INVENTION

In the following, the feed mixture distribution device 1 configured to evening out a feed of feed mixture in an annular feed mixture feed channel 2 of a burner 3 such as a concentrate or matte burner for or of a suspension smelting furnace (not illustrated in the drawings) and some variants and embodiments of the feed mixture distribution device 1 will be described in greater detail.

The feed mixture can for example comprise sulfidic copper concentrate, matte, metallurgical dust, flux, slag forming material, scrap metal, and metal containing scrap.

The feed mixture distribution device 1 comprises a cylindrical member 4 having a cylindrical wall 5, a first end 6, a second end 7, and a longitudinal central axis X.

The cylindrical member 4 of the feed mixture distribution device 1 is at the first end 6 provided with rectangular flat plate means 8, which extend radially from the cylindrical wall 5 of the cylindrical member 4 and which are arranged symmetrically about the longitudinal central axis X of the cylindrical member 4. The purpose of the rectangular flat plate means 8 is to divide the annular feed mixture feed channel 2 in a burner 3 into identical sectors 9 at the rectangular flat plate means 8, when the feed mixture distribution device 1 is arranged in the annular feed mixture feed channel 2 of a burner 3. A result of this is that a feed of feed mixture that is fed into the annular feed mixture feed channel 2 of a burner 3 will be divided into the sectors 9 at the first end 6 of the feed mixture distribution device 1.

The cylindrical wall 5 of the cylindrical member 4 is between the rectangular flat plate means 8 and the second end 7 of the feed mixture distribution device 1 provided with helical plate means 10 arranged symmetrically about the longitudinal central axis X of the cylindrical member 4.

Each helical plate means 10 can, as shown in the figures, be formed as a structural extension of one rectangular flat plate means 8.

Each helical plate means 10 extend towards the second end 7 of the cylindrical member 4 in a helical manner about the longitudinal central axis X of the cylindrical member 4. This will give the feed mixture feed a uniform radial distribution in each sector 9 of the annular feed mixture feed channel 2 of the burner 3, when the feed mixture distribution device 1 is in use in the annular feed mixture feed channel 2 of a burner 3.

Each helical plate means 10 has a downstream end 11 and a feed mixture bearing surface 12. The width of the feed mixture bearing surface 12 of the helical plate means 10 as measured along a line normal to the longitudinal central axis X of the cylindrical member 4 decreases in a direction towards the downstream end 11 of the helical plate means 10. This means that if the feed mixture bearing surface 12 of the helical plate means 10 is inclined and/or curved in relation to a line normal to the longitudinal central axis X of the cylindrical member 4, the actual width of the feed mixture bearing surface 12 of the helical plate means 10 can be constant throughout the mixture bearing surface 12 of the helical plate means 10 at the same this as the width of the feed mixture bearing surface 12 of the helical plate means 10 as measured along a line normal to the longitudinal central axis X of the cylindrical member 4 decreases in a direction towards the downstream end 11 of the helical plate means 10. This also means that if the feed mixture bearing surface 12 of the helical plate means 10 is parallel with a line normal to the longitudinal central axis X of the cylindrical member 4 throughout the helical plate means 10, the actual width of the feed mixture bearing surface 12 of the helical plate means 10 decreases in a direction towards the downstream end 11 of the helical plate means 10.

Because the width of the feed mixture bearing surface 12 of the helical plate means 10 decreases in the discharging portion in a direction towards the downstream end 11 of the helical plate means 10, feed mixture that slides on the feed mixture bearing surface 12 of the helical plate means 10 will gradually fall from the feed mixture bearing surface 12 of the helical plate means 10 as feed mixture slides on the feed mixture bearing surface 12 of the helical plate means 10 towards the downstream end 11 and feed mixture will be evenly spread out into the annular feed mixture feed channel 2 of a burner 3 downstream of the helical plate means 10, when the feed mixture distribution device 1 is in use in the annular feed mixture feed channel 2 of a burner 3.

In the embodiments of the feed mixture distribution device 1 shown in FIGS. 21 to 40, each helical plate means 10 is formed as a structural extension of one rectangular flat plate means 8.

Each helical plate means 10 comprises preferably, but not necessarily, as in the embodiments of the feed mixture distribution device 1 shown in FIGS. 1 to 20, an upstream helical plate section 13, which comprises a part of the feed mixture bearing surface 12 and which extend towards the second end 7 of the cylindrical member 4 in a helical manner about the longitudinal central axis X of the cylindrical member 4 and a downstream helical plate section 14, which comprises a part of the feed mixture bearing surface 12 and which extend towards the second end 7 of the cylindrical member 4 in a helical manner about the longitudinal central axis X of the cylindrical member 4. Each upstream helical plate section 13 of the helical plate means 10 is preferably, but not necessarily, formed as a structural extension one rectangular flat plate means 8. A slit 15 is provided between each upstream helical plate section 13 of the helical plate means 10 and each downstream helical plate section 14 of the helical plate means 10. Each downstream helical plate section 14 of the helical plate means 10 can, as shown in FIGS. 1 to 20, also form a structural extension of one upstream helical plate section 13 of an adjacent helical plate means 10. The handedness of the upstream helical plate section 13 of the helical plate means 10 is different than the handedness of the downstream helical plate section 14 of the helical plate means 10. The downstream end 11 of the helical plate means 10 is a part of the downstream helical plate section 14 of the helical plate means 10. In this embodiment, the feed mixture feed will first be divided into sectors 9 of the annular feed mixture feed channel 2 and fall towards the feed mixture bearing surface 12 of the upstream helical plate section 13 of the helical plate means 10. The upstream helical plate section 13 of the helical plate means 10 will give the feed mixture feed a uniform radial distribution as feed mixture slides on the feed mixture bearing surface 12 of the upstream helical plate section 13 of the helical plate means 10. The feed mixture feed will thereafter flow through the slit 15 between each upstream helical plate section 13 of the helical plate means 10 and each downstream helical plate section 14 of the helical plate means 10 onto the feed mixture bearing surface 12 of the downstream helical plate section 14 of the helical plate means 10. The downstream helical plate section 14 of the helical plate means 10 will give the feed mixture feed a uniform tangential distribution as feed mixture slides on the feed mixture bearing surface 12 of the downstream helical plate section 14 of the helical plate means 10 and because the width of the feed mixture bearing surface 12 decreases in a direction towards the downstream end 11, feed mixture that slides on the feed mixture bearing surface 12 of the downstream helical plate section 14 of the helical plate means 10 will gradually fall from the feed mixture bearing surface 12 and feed mixture will be spread out into the annular feed mixture feed channel 2 of a burner 3 downstream of the helical plate means 10, when the feed mixture distribution device 1 is in use in a burner 3 and when feed mixture slides towards the downstream end 11 on the feed mixture bearing surface 12 of the downstream helical plate section 14 of the helical plate means. The upstream helical portion section of the helical plate means 10 can for example extend for 45 to 120° around said longitudinal central axis X. The downstream helical portion of the helical plate means 10 of the cylindrical member 4 can for example extend for 60 to 360° around said longitudinal central axis X of the cylindrical member 4.

If the helical plate means 10 of the feed mixture distribution device 1 comprises upstream helical plate section 13 and a downstream helical plate section 14, the width of the feed mixture bearing surface 12 of each upstream helical plate section 13 of the helical plate means 10 as measured along a line normal to the longitudinal central axis X of the cylindrical member 4 is preferably, but not necessarily, constant throughout the complete upstream helical plate section 13 of the helical plate means 10. This allows for selecting the width of the feed mixture bearing surface 12 of each upstream helical plate section 13 of the helical plate means 10 so that the feed mixture distribution device 1 at the region of the upstream helical plate sections 13 essentially completely fills the annular feed mixture feed channel 2 of the burner 3 resulting in that feed mixture cannot slip past the feed mixture distribution device 1 and in that feed mixture is forced to be guided on the feed mixture bearing surface 12 of the upstream helical plate sections 13.

If the helical plate means 10 of the feed mixture distribution device 1 comprises upstream helical plate section 13 and a downstream helical plate section 14, the width of the feed mixture bearing surface 12 of an upstream end section 16 of each downstream helical plate section 14 of the helical plate means 10 as measured along a line normal to the longitudinal central axis X of the cylindrical member 4 is preferably, but not necessarily, constant throughout the complete upstream end section 16 of the downstream helical plate section 14 of the helical plate means 10. This allows for selecting the width of the feed mixture bearing surface 12 of the upstream end section 16 of each downstream helical plate section 14 of the helical plate means 10 so that the feed mixture distribution device 1 at the region of the upstream end section 15 of each downstream helical plate sections 14 essentially completely fills the annular feed mixture feed channel 2 of the burner 3 resulting in that feed mixture cannot slip past the feed mixture distribution device 1 and in that feed mixture is forced to be guided on the feed mixture bearing surface 12 of the upstream end section 15 of each downstream helical plate section 14.

The helical plate means 10 can have a downstream edge 19 that extend from a first point to the downstream end 11 of the helical plate means 10, wherein the first point is closer to the first end 6 of the cylindrical member 4 than the downstream end 11 of the helical plate means 10, as measured along a line parallel with the longitudinal central axis X of the cylindrical member 4. The downstream edge 19 of each helical plate means 10 extends preferably, but not necessarily, in the form of one single arc between the first point and the downstream end 11.

The helical plate means 10 can have a downstream edge 19 that extend from a first point to a second point via the downstream end 11 of the helical plate means 10, wherein the downstream end 11 of the helical plate means 10 is closer to the second end 7 of the cylindrical member 4 than the first point and the second point as measured along a line in parallel with the longitudinal central axis X of the cylindrical member 4. The downstream edge 19 of each helical plate means 10 extends preferably, but not necessarily, in the form of one single arc between the first point and the downstream end 11 and extends preferably, but not necessarily, in the form of one single arc between the downstream end 11 and the second point.

The helical plate means 10 can have two downstream ends 11 so that a downstream edge 19 extend from one downstream end 11 of the helical plate means 10 to another downstream end 11 of the helical plate means via a third point, wherein the downstream ends 11 of the helical plate means 10 are closer to the second end 7 of the cylindrical member 4 than the third point as measured along a line in parallel with the longitudinal central axis X of the cylindrical member 4. The downstream edge 19 of each helical plate means 10 extends preferably, but not necessarily, in the form of one single arc between one of the downstream ends 11 and the third end and extends preferably, but not necessarily, in the form of one single arc between the other of the downstream end 11 and the third point.

The rectangular flat plate means 8 and the helical plate means 10 can, as shown in FIGS. 1 to 5 and 11 to 40*m* extend radially outwardly from the cylindrical member 4 and be fastened to the cylindrical member 4. In such embodiments, it is possible that the cylindrical member 4 of the feed mixture distribution device 1 is formed by an inner cylindrical wall 17, which radially inwards limits the annular feed mixture feed channel 2 of the burner, as shown in FIG. 48.

The rectangular flat plate means 8 and the helical plate means can, as shown in FIGS. 6 to 10, extend radially inwardly from the cylindrical member 4 and be fastened to the cylindrical member 4. In such embodiments, it is possible that the cylindrical member 4 of the feed mixture distribution device 1 is formed by an outer cylindrical wall 18, which radially outwards limits the annular feed mixture feed channel 2 of the burner 3, as shown in FIG. 47.

It is also possible that the feed mixture distribution device 1 is releasable arranged between an inner cylindrical wall 17, which radially inwards limits the annular feed mixture feed channel 2 of the burner 3, and an outer cylindrical wall 18, which radially inwards limits the annular feed mixture feed channel 2 of the burner 3, as shown in FIGS. 49 and 50.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A feed mixture distribution device configured to evening out a feed of feed mixture in an annular feed mixture feed channel of a burner, wherein the feed mixture distribution device comprises:
   a cylindrical member having a cylindrical wall, a first end, a second end, and a longitudinal central axis X, and
   wherein the cylindrical member is at the first end provided with rectangular flat plate means, which extend radially from the cylindrical wall of the cylindrical member and which are arranged symmetrically about the longitudinal central axis X of the cylindrical member,
   wherein
   the cylindrical wall of the cylindrical member is between the rectangular flat plate means and the second end provided with at least one helical plate means arranged symmetrically about the longitudinal central axis X of the cylindrical member,
   each helical plate means extend towards the second end of the cylindrical wall of the cylindrical member in a helical manner about the longitudinal central axis X of the cylindrical member,
   each helical plate means has a downstream end and a feed mixture bearing surface, wherein the width of the feed mixture bearing surface as measured along a line normal to the longitudinal central axis X of the cylindrical member decreases in a direction towards the downstream end of the helical plate means,
   each helical plate means comprises an upstream helical plate section, which comprises a part of the feed mixture bearing surface and which extend towards the second end of the cylindrical member in a helical manner about the longitudinal central axis X of the cylindrical member and a downstream helical plate section, which comprises a part of the feed mixture bearing surface and which extend towards the second end of the cylindrical member in a helical manner about the longitudinal central axis X of the cylindrical member,
   a slit between each upstream helical plate section of the helical plate means and each downstream helical plate section of the helical plate means,
   the handedness of the upstream helical plate section of the helical plate means being different than the handedness of the downstream helical plate section of the helical plate means, and
   the downstream end of the helical plate means being a part of the downstream helical plate section of the helical plate means.

2. The feed mixture distribution device according to claim 1, wherein
   each upstream helical plate section of the helical plate means form a structural extension of one rectangular flat plate means.

3. The feed mixture distribution device according to claim 1, wherein
   each downstream helical plate section of the helical plate means form a structural extension of the upstream helical plate section of the adjacent helical plate means.

4. The feed mixture distribution device according to claim 1, wherein
the width of the feed mixture bearing surface of each upstream helical plate section of the helical plate means, as measured along a line normal to the longitudinal central axis X of the cylindrical member, being constant throughout the complete upstream helical plate section of the helical plate means.

5. The feed mixture distribution device according to claim 1, wherein
the width of the feed mixture bearing surface of an upstream end section of each downstream helical plate section of the helical plate means, as measured along a line normal to the longitudinal central axis X of the cylindrical member, being constant throughout the complete upstream end section of the downstream helical plate section of the helical plate means.

6. The feed mixture distribution device according to claim 1, wherein
each helical plate means comprises a downstream edge extending from a first point to the downstream end of the helical plate means, wherein the downstream end is closer to the second end of the cylindrical member than the first point, as measured along a line parallel with the longitudinal central axis X of the cylindrical member.

7. The feed mixture distribution device according to claim 1, wherein
each helical plate means comprises a downstream edge extending from a first point to a second point via the downstream end of the helical plate means, wherein the downstream end of the helical plate means is closer to the second end of the cylindrical member than the first point and the second point as measured along a line in parallel with the longitudinal central axis X of the cylindrical member.

8. The feed mixture distribution device according to claim 1, wherein
each helical plate means comprises two downstream edges extending from one of the two downstream ends to the other downstream end via a third point, wherein the third point is closer to the first end of the cylindrical member than the two downstream ends as measured along a line in parallel with the longitudinal central axis X of the cylindrical member.

9. The feed mixture distribution device according to claim 6, wherein
the downstream edge of each helical plate means extend in a curved and/or in an angled fashion.

10. The feed mixture distribution device according to claim 1, wherein
the rectangular flat plate means and the helical plate means extending radially outwardly from the cylindrical member and being fastened to the cylindrical member.

11. The feed mixture distribution device according to claim 10, wherein
the cylindrical wall of the feed mixture distribution device being formed by an inner cylindrical wall, which radially inwards limits the annular feed mixture feed channel of the burner.

12. The feed mixture distribution device according to claim 1, wherein
the rectangular flat plate means and the helical plate means extending radially inwardly from the cylindrical member and being fastened to the cylindrical member.

13. The feed mixture distribution device according to claim 10, wherein
the cylindrical wall of the feed mixture distribution device being formed by an outer cylindrical wall, which radially outwards limits the annular feed mixture feed channel of the burner.

14. The feed mixture distribution device according to claim 10, wherein
the feed mixture distribution device being releasable arranged between an inner cylindrical wall, which radially inwards limits the annular feed mixture feed channel of the burner, and an outer cylindrical wall, which radially inwards limits the annular feed mixture feed channel of the burner.

\* \* \* \* \*